Patented Jan. 3, 1933

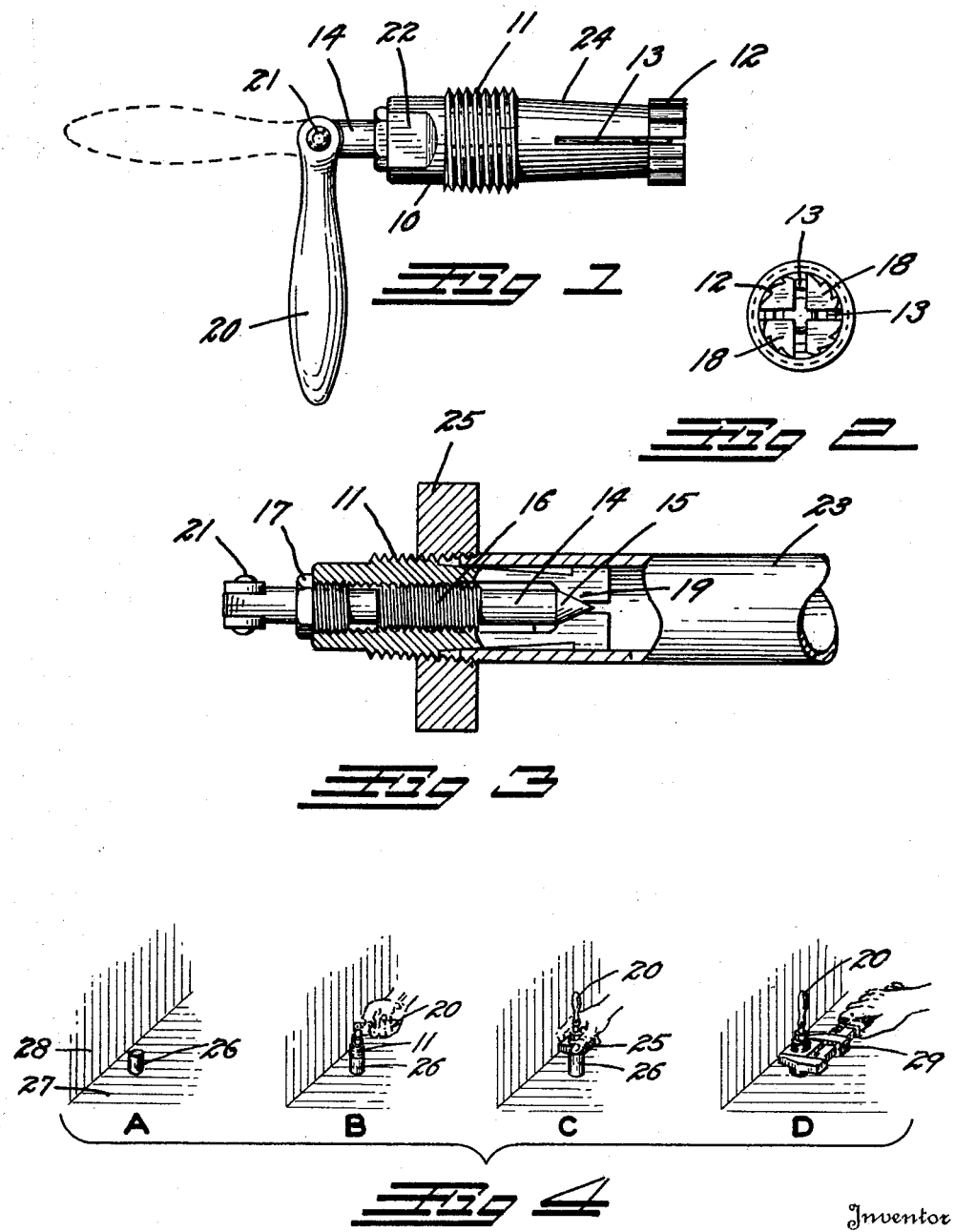

1,892,904

UNITED STATES PATENT OFFICE

QUINT ORVAL ROBINSON AND GEORGE HENRY GOULDEN, OF DENVER, COLORADO

PIPE THREADING DEVICE

Application filed November 6, 1931. Serial No. 573,332.

This invention relates to a device for starting and guiding a pipe threading die onto a pipe. It is exceedingly difficult to operate the usual die stocks upon installed pipes in close quarters and it is practically impossible to start a die upon a pipe without a die stock to hold and guide it. The principal object of this invention is to provide a device which can be quickly applied to the extremity of a pipe in a close place and which will act to guide and lead a die onto the pipe so that the die itself can be turned with a wrench or other device without requiring a die stock.

Another object is to so construct the device that it will automatically act to remove the burr that is usually left by a pipe cutter.

Other objects and advantages reside in the detailed construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a side elevation of the improved pipe threading device.

Fig. 2 is an elevation of the inner end of the device.

Fig. 3 is a longitudinal section therethrough illustrating the invention in place in a pipe extremity.

Fig. 4 illustrates a series of four diagrams showing the use of the device in a close place.

The invention comprises an outer shell 10 upon which a series of threads 11 are formed, similar in size and pitch to the standard die for the pipe upon which the device is to be used. A band of reaming and gripping teeth 12 are formed on the inner extremity of the shell 10. This inner extremity is rendered expansible by means of a series of longitudinal slots 13. The shell 10 is tapered between the threads 11 and the teeth 12, as shown at 24. The shell 10 is provided with two or more wrench faces 22 adjacent its outer extremity. A wedge rod 14, provided with a pointed extremity 15, is threaded into the shell 10 by means of suitable threads 16. A sleeve nut 17 is threaded into the shell 10 after the wedge rod 14 is in place to prevent the latter from being entirely unscrewed therefrom.

It will be noted that the slots 13 divide the inner extremity into a series of segments 18, each of which has an internal shoulder 19 against which the pointed extremity 15 acts. The wedge rod may be rotated by means of a handle 20 which is pivoted thereto as shown at 21.

Let us assume that it is desired to cut threads on the extremity of a length of pipe, such as illustrated at 23, Fig. 3. The inner extremity of the shell 10 is forced into the open extremity of the pipe 23. Should there be an inwardly extending burr on the pipe left by a pipe cutter, this can be quickly removed by rotating the shell and allowing the teeth 12 to cut away the burr. After removing the burr, the shell is forced into the pipe until the tapered portion 24 wedges tightly into the open extremity. This wedging of the tapered portion acts to automatically center the threads 11 with the pipe.

The wedge rod 14 is now rotated by means of the handle to force the pointed extremity against the wedge blocks 19. This causes the segments 18 to expand and force the teeth 12 into the interior surface of the pipe so as to lock the device firmly in place thereon. A threading die, such as indicated at 25, is now passed over the shell 10, the handle 20 may be swung to the broken line position of Fig. 1 to allow passage of the die 25. As the die 25 is rotated it will thread onto the threads 11 and will be led accurately and uniformly onto the extremity of the pipe 23. It may be rotated by any desired tool such as a monkey wrench or pipe wrench.

To illustrate the use of the device, a pipe extremity is indicated in Fig. 4—A, at 26 extending but a short distance above a floor 27 and in close proximity to a wall 28. With the usual pipe die stocks it would be impossible to put a thread on the extremity of the pipe 26 owing to lack of room for the stock guide and lack of room to rotate the stock. With this invention, however, it is a simple matter. The shell 10 is simply dropped in the open extremity of the pipe 26 and the handle 20 is rotated as shown in Fig. 4—B. The die 25 is then dropped over the shell 10 as shown in Fig. 4—C, and the die is rotated by means of a wrench as indicated at 29, in Fig. 4—D, until the desired length of thread is cut.

A wrench may be used on the wrench faces 22 to hold the shell 10, if necessary, while the wedge rod 14 is being tightened. These faces also provide a place for a wrench when turning the device to ream the pipe extremity. It is desired to call particular attention to the shape of the reaming and gripping teeth 12, as shown in Fig. 2. These teeth are formed similar to the usual reamer teeth with a ratchet shape having relatively sharp radial cutting edge. This particular shape provides teeth which serve a double purpose. First, they will act as a reamer to cut away any inwardly projecting burrs and they will also provide a sharp edge which will bite into the pipe interior to prevent rotation of the shell 10.

While a specific form of the improvement has been described and illustrated herein, it is desired to be understood that the same may be varied within the scope of the appended claims, without departing from the spirit of the invention.

Having thus described the invention, what is claimed and desired to be secured by Letters Patent is:—

1. A device for starting and guiding a pipe threading die onto a pipe comprising: a shell; an expansible extremity formed on said shell; teeth formed on said expansible extremity; a series of die receiving threads surrounding and spaced from said expansible extremity; means for expanding said expansible extremity so as to cause said teeth to grip the interior of said pipe; and a tapered portion formed on said shell between said teeth and said threads arranged to automatically center said threads with said pipe.

2. A device for starting and guiding a pipe threading die onto a pipe comprising: a shell; threads formed on said shell similar to the threads desired on said pipe; an inner extremity on said shell arranged to pass into said pipe; a plurality of segments formed on said interior extremity of said shell; teeth on the outer face of each of said segments; means for separating said segments so as to expand them against the interior of said pipe, said means comprising, a wedge rod threaded axially onto said shell; a pointed extremity on said wedge rod arranged to pass between said segments and force the latter outwardly against the inner surface of said pipe; and a locking nut threaded into said shell about said wedge rod so as to prevent withdrawal of the latter.

3. A device for starting and guiding a pipe threading die onto a pipe comprising: a shell; threads formed on said shell similar to the threads desired on said pipe; an inner extremity on said shell arranged to pass into said pipe; a plurality of segments formed on said interior extremity of said shell; teeth on the outer face of each of said segments; means for separating said segments so as to expand them against the interior of said pipe, said means comprising, a wedge rod threaded axially into said shell; a pointed extremity on said wedge rod arranged to pass between said segments and force the latter outwardly against the inner surface of said pipe; a locking nut threaded into said shell about said wedge rod so as to prevent withdrawal of the latter; and a handle member pivoted to said wedge rod so that it may swing at any desired angle therefrom.

4. A device for starting and guiding a pipe threading die onto a pipe comprising: a shell; an expansible extremity formed on said shell; teeth formed on said expansible extremity; a series of die receiving threads surrounding and spaced from said expansible extremity; means for expanding said expansible extremity so as to cause said teeth to grip the interior of said pipe, said teeth being ratchet shaped; and wrench faces formed on said shell so that the latter may be rotated so as to cause said teeth to act to ream the interior of said pipe.

5. A device for starting and guiding a pipe threading die onto a pipe comprising: a shell, one extremity of said shell being longitudinally split; threads formed on said shell similar to the threads desired on said pipe; a band of teeth surrounding said split extremity; a tapered portion on said shell between said band of teeth and said threads so as to contact with the inner face of said pipe and center said threads thereover; and means for expanding said split extremity.

6. A device for starting and guiding a pipe threading die onto a pipe comprising: a shell, one extremity of said shell being longitudinally split and hollow for the major portion of its length; threads formed on said shell similar to the threads desired on said pipe; a band of teeth surrounding said split extremity; a tapered portion on said shell between said band of teeth and said threads so as to contact with the inner face of said pipe and center said threads thereover; inwardly extending shoulders formed on said split extremity so as to substantially close the hollow at that extremity; and a wedge rod adapted to be projected into the hollow of said shell so as to contact with said shoulders and expand said split extremity.

In testimony whereof, we affix our signatures.

QUINT ORVAL ROBINSON.
GEORGE HENRY GOULDEN.